United States Patent

Pinckaers

[15] 3,660,718

[45] May 2, 1972

[54] AUTOMATICALLY RESETTING MOTOR PROTECTION CIRCUIT RESPONSIVE TO OVERCURRENT AND OVERTEMPERATURE

[72] Inventor: Balthasar H. Pinckaers, Edina, Minn.

[73] Assignee: Honeywell Inc., Minneapolis, Minn.

[22] Filed: June 8, 1970

[21] Appl. No.: 44,499

[52] U.S. Cl. .....................317/13 B, 317/335 C, 317/36 TD, 317/22, 317/40, 318/454, 318/473, 318/474
[51] Int. Cl. ........................................H02h 7/08, H02h 3/10
[58] Field of Search ..................317/13 B, 13, 33, 36 TD, 22, 317/40; 318/453, 454, 473, 474; 322/22, 23

[56] References Cited

UNITED STATES PATENTS

| 3,369,154 | 2/1968 | Swain | 317/36 TD |
| 3,417,290 | 12/1968 | Craddock | 317/13 |
| 3,457,460 | 7/1969 | Buiting | 317/33 SC X |
| 3,526,809 | 9/1970 | Obenhaus | 317/13 B |

Primary Examiner—J. D. Miller
Assistant Examiner—Harvey Fendelman
Attorney—Lamont B. Koontz and Alfred N. Feldman

[57] ABSTRACT

A protection system for hermetic compressors which senses the current being drawn by the compressor motor, and the condition of the motor as a function of a safety switch means which is enclosed within the system or motor. A locked rotor current overload causes immediate operation of the electronics to disconnect the motor from the line. A slowly rising unsafe condition, which is sensed by the opening of the safety switch means, also removes the motor from the line. The electronic circuitry has a time delay discharge network that prevents reclosing the electrical contactor until a sufficient delay has existed for pressures in the compressor system to fall to a safe level.

9 Claims, 1 Drawing Figure

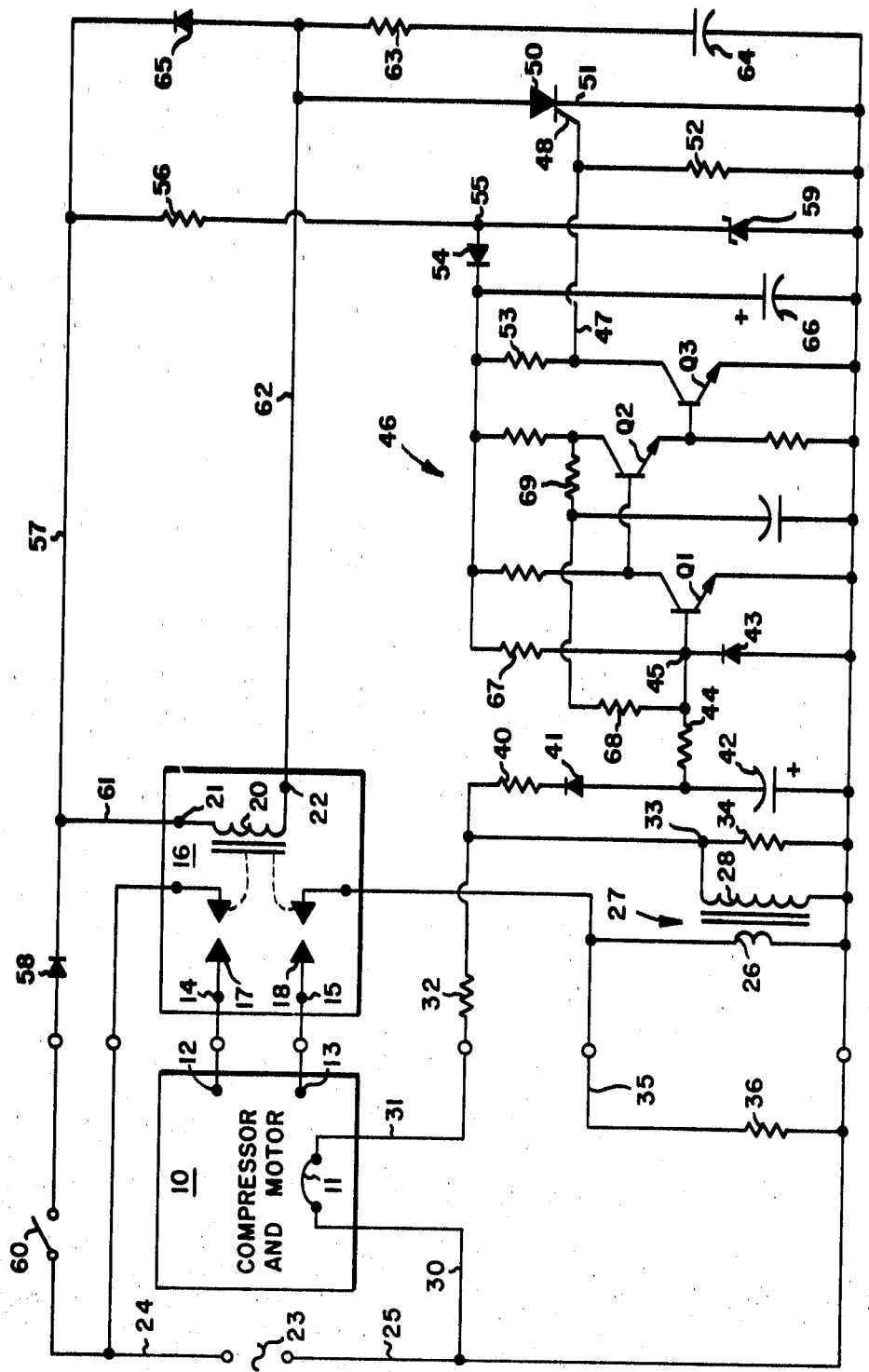

AUTOMATICALLY RESETTING MOTOR PROTECTION CIRCUIT RESPONSIVE TO OVERCURRENT AND OVERTEMPERATURE

BACKGROUND OF THE INVENTION

In operating electrically driven equipment particularly hermetic compressor systems for refrigeration and air conditioning, three types of unsafe conditions for the equipment are commonly involved. One is a locked rotor surge current in the electric motor when a malfunction occurs preventing the electric motor from rotating. A second is a motor temperature overload when the motor is operating under an excessive load, such as when the refrigeration coil freezes up. The third problem arises in trying to restart a compressor under load shortly after it has stopped. This can occur due to a malfunction or due to a resetting of the controller, such as a thermostat. These three problems are ordinarily handled with three separate safety systems or circuits, but this is excessively expensive. In the present invention, all three of these problems are handled by a single system.

SUMMARY OF THE INVENTION

The present invention is an electronic control system that utilizes a current transformer to sense the motor current being drawn by the electric motor that drives the compressor in a refrigeration system. This motor current is monitored by the primary winding of the current transformer and an output current is supplied through the secondary of the transformer. This secondary current is monitored as a voltage across a pair of parallel impedances. One of the impedances is removed from the circuit in the event of a slowly changing overload or other malfunctions while the combination of impedances is monitored in the event of locked rotor overload. An electronic circuit senses the condition of the voltage across the impedances and allows the system to continue to operate or to be very quickly removed from the line depending on the state of the voltage. In the event that the system does function to remove the compressor motor from the supply voltage, a time delay network prevents the resetting of the system for a sufficiently long period for the pressures in the compressor system to drop to an acceptable level.

BRIEF DESCRIPTION OF THE DRAWING

The single FIGURE of the present application is a complete schematic diagram of a conventional hermetic compressor, contactor, and electronics necessary for safety control and protection of the system.

DESCRIPTION OF THE PREFERRED EMBODIMENT

The system protection circuit of the present invention is intended to be connected to a system such as one having hermetic compressor and electric motor generally disclosed at 10. By way of example only, and not as a limitation to the type of system to be protected, the hermetic compressor and motor 10 are shown. Located in the compressor and motor 10 is a safety switch means 11. The safety switch means 11 can be any type of switch that is responsive to an unsafe parameter of the system such as temperature, pressure, etc. In the conventional hermetic compressor the safety switch means 11 would be a thermally responsive switch which was attached to or embedded in the motor winding so as to sense the temperature of the motor winding and protect the motor in the event of an unsafe temperature rise. The safety switch means 11 further could be a series of switches responsive to different parameters, such as one being a temperature sensitive function, while a second series switch might be a pressure responsive element.

The compressor and motor 10 is connected by terminals 12 and 13 to terminals 14 and 15 of a controllable switch means generally disclosed as 16. The controllable switch means 16 in a conventional refrigeration or air conditioning system would be an electromagnetic contactor including a pair of mechanical contacts 17 and 18 which are operated by an electromagnetically linked coil 20. Coil 20 has terminals 21 and 22 to connect it to the system.

A source of voltage 23 is disclosed and would be the ordinary alternating current line voltage supplied to most residential or industrial locations. The source of voltage 23 is connected through conductor 24 and contact 17 to terminal 12 of the compressor and motor 10. A second conductor for the source of voltage 23 is a conductor 25 and conductor 25 is connected through a primary winding 26 of a current transformer 27 to contact 18 of the controllable switch means 16 and then to the terminal 13 of the compressor and motor 10. This arrangement supplies the source of voltage 23 in a controllable fashion to the compressor and motor 10 in a conventional fashion except for the inclusion of the primary winding 26 of the current transformer 27. The current transformer 27 has a secondary winding 28 that is magnetically coupled in a conventional fashion to the primary winding 26.

Conductor 25 is connected by conductor 30 to the safety switch means 11 which is further connected by conductor 31 to an impedance 32, in the form of a resistor, and is connected to a terminal 33 of the current transformer secondary 28. A further optional impedance means 34 is connected between terminal 33 and the conductor 25 so that it is in parallel with the secondary winding 28 of the current transformer 27. The current transformer primary 26 is shunted at 35 by a shunt resistor 36 that adjusts the current being drawn through the primary 26 to a level to match the particular compressor and motor 10 that is being controlled. The shunt 36 may or may not be used, depending on the construction of the current transformer 27. It would be possible to use a different current transformer 27 for each application if it were desired, but this arrangement can be simplified by using a single current transformer 27 and an adjusting shunt 36 so that the current flow through the winding 26 is at a proper level, as will be described in connection with the operation of the system.

Connected across the current transformer secondary 28 is a resistor 40, a diode 41, and an energy storage means 42 disclosed as a capacitor. The capacitor 42 charges to a voltage determined by the output voltage of the secondary 28 of the current transformer 27. Connected across the energy storage means 42 is a diode 43 and a resistor means 44 that form a discharge path for the capacitor 42 and provide a timing function that will be described in connection with the operation of the circuit. The junction of the diode 43 and the resistor means 44 is at 45 and this point forms an input to a switching circuit means generally disclosed at 46. The switching circuit means 46 includes a first transistor Q1 which is normally in conduction during the operation of the system. The output of the transistor Q1 controls a second transistor Q2. Since transistor Q1 is across the base and emitter of transistor Q2, when Q1 is "on," Q2 is normally "off." Transistor Q2 further controls a third transistor Q3, which follows the operation of transistor Q2 in a well-known fashion. The output circuit from transistor Q3 is by way of a conductor 47 to a gate 48 of a solid state switch 50, that is disclosed as a silicon controlled rectifier. Connected between the gate 48 and a cathode 51 of the silicon controlled rectifier is a resistor 52 that has a voltage developed across it to control the conduction of the silicon controlled rectifier 50. Current is supplied to resistor 52 through a resistor 53 and a diode 54 from a voltage regulated point 55 which is controlled by a Zener diode 59, in a conventional fashion. Point 55 is connected through a dropping resistor 56 to a conductor 57 that is connected through a diode 58 and a controller 60 to the source of voltage 23 through conductor 24. The controller 60 in a conventional air conditioning system would be a thermostat, but has been shown as a simple switch for convenience.

The voltage on conductor 57 is also supplied by way of a conductor 61 to the controllable switch means 16 and through the coil 20 to a conductor 62 which is connected to the anode of the silicon controlled rectifier 50. The circuit includes a transient suppressant circuit made up of resistor 63 and capacitor 64 in a conventional fashion along with a free-wheeling diode 65 for coil 20. A power storage capacitor 66 and resistors 67, 68 and 69 are included in the switching circuit means 46.

OPERATION

In the operation of the disclosed system, the source of voltage 23 is normally available through some circuit protective device, as is conventional and is applied to the system by closing the controller 60. Current is drawn through the diode 58 and through the controllable switch means 16 to energize the coil 20 to close the contacts 17 and 18 to energize the compressor and motor 10. The current drawn through the coil 20 flows through conductor 62 and the silicon controlled rectifier 50.

The energizing or gating current, which controls the state of conduction of the silicon controlled rectifier 50, is a direct current which flows out of upper terminal of storage capacitor 66 through resistor 53, resistor 52 and gate-cathode circuit of silicon controlled rectifier 50 in parallel, to the lower terminal of capacitor 66. The direct current voltage across capacitor 66 in turn is derived from a (half-wave) charging current which flows from the upper terminal of alternating current source 23 through controller 60, diode 58, conductor 57, resistor 56, junction 55, and the parallel combination of Zener diode 59 and rectifier diode 54 and capacitor 66 in series. This charging current flows only when upper terminal of alternating current source 23 is positive with respect to the lower terminal. This function of the Zener diode 59 is to act as a clipper or regulator so that the direct current voltage across capacitor 66 is virtually unaffected by alternating currently supply variations.

The gating current triggers silicon controlled rectifier 50 into conduction early in each half-wave applied through rectifier 58. The free-wheeling diode 65 maintains current in coil 20 during the reverse polarity half-cycles of alternating current source 23 so that controllable switch means 16 keeps its contacts 17 and 18 closed. This puts the compressor and motor 10 into normal operation as long as the safety switch means 11 is closed and the transistor Q3 is non-conductive.

The flow of current to the compressor and motor 10 is through the current transformer primary 26 and a voltage is therefore generated across the current transformer secondary 28. The voltage appearing across secondary 28 is applied through the diode 41 and resistor 40 to the energy storage means or capacitor 42 to charge that capacitor to a definite level that is related to the normal voltage appearing across the secondary winding 28.

The voltage across capacitor 42 is applied through a resistor 44 to the input junction 45 of transistor Q1. Since the lower terminal of capacitor 42 is the positive one, and the transistors shown are of the NPN variety, a negative input current is in effect furnished thereby to transistor Q1. However, transistor Q1 also receives positive input currents through resistor 67 and through the series combination of resistors 68 and 69. These currents are furnished by the direct current voltage existing across storage capacitor 66 which in effect acts as a direct current voltage source, of predetermined magnitude, for the switching circuit means 46. As long as the positive input currents exceed the negative input current, transistor Q1 remains conductive thereby keeping "off" transistors Q2 and Q3 which in turn allows compressor and motor 10 to operate in a normal fashion.

When the controller 60 is opened, the energy to the controllable switch means 16 is removed and the contacts 17 and 18 are open to disconnect the compressor and motor 10 from the source of voltage 23. At this time the capacitor 42 still retains a charge, and this charge starts to discharge through the time delay network made up of the diode 43 and the large resistor 44. This discharge path insures that a voltage will appear at 45 at this time which is of a nature to keep the transistor Q1 in an "off" condition in the event of the reapplication of the voltage to the system. When transistor Q1 is "off," the transistors Q2 and Q3 would be in conduction and transistor Q3 shorts out the gate 48 of the silicon controlled rectifier 50 thereby insuring that the controllable switch means 16 cannot be reactivated for the delay time period. This prevents the compressor and motor 10 from being restarted for some time once it has been stopped. This protects against having to start against a large pressure head in the compressor. Starting against a large pressure head can be very detrimental to a refrigeration system, and it has long been recognized that it is desirable to wait anywhere from 3 to 5 minutes in restarting a compressor after it has once been stopped.

The operation described above is the normal operation of the system in which the safety switch means 11 has remained closed and there has been no abnormal amount of current drawn by the compressor and motor 10. Two unsafe types of operation are protected against by the present system. In the event that the controller 60 is closed, and the compressor and motor are in a starting phase or have been started, the system is protected gainst the motor and compressor suddenly locking or freezing up so that a condition known as "locked rotor" occurs. In a "locked rotor" condition, the motor is not rotating and there in no back electromagnetic force to minimize the current flow in the motor to a normal level. In the case of a "locked rotor", very high and damaging current flows in the compressor and motor 10 which unlike the normal starting current remains at this high value. This very large current would be drawn through the current transformer primary 26 and would be immediately transformed and provided as a high voltage across winding 28. This substantial voltage then appears in time across the capacitor 42. At a predetermined level of voltage across 42 transistor Q1 is regeneratively turned "off" and transistors Q2 and Q3 turn "on" thereby shorting out the gate 48 of the silicon controlled rectifier 50 and causing the silicon controlled rectifier 50 to cease conducting. This causes the controllable switch means 16 to be de-energized nearly at once and the contacts 17 and 18 open to remove the compressor and motor 10 from the line. This arrangement also has left a substantial charge on the capacitor 42 which must be discharged through the diode 43 and the large resistor 44 before switching circuit means 46 resets and the controllable switch means 16 can close again. This time delay provides a protection against restarting until safe levels of pressure have returned in the compressor and motor 10.

A second type of unsafe condition for the system is a slowly increasing pressure above a desired normal, or a slowly increasing motor temperature above the desired normal. This increase in temperature or pressure is sensed by the safety switch means 11 and the safety switch means 11 then opens. Upon opening of the safety switch means 11, the resistor 32 is removed from the parallel relationship it has had with the resistor 34. Since the parallel resistor 32 is removed from a parallel relationship with the resistor 34, the voltage output at 33 of the secondary winding 28 is allowed to increase as the current transformer 27 is not loaded down as much as the voltage appearing across the energy storage means or capacitor 42 rises. This rise in voltage again is applied to the terminal 45 to turn the transistor Q1 "off" thereby allowing transistors Q2 and Q3 to be put into conduction to shut down the system. A very short or momentary opening of the safety switch means 11, such as by an unusual vibration, is not sufficient to shut the system down but the safety switch means 11 must be kept open for some minor amount of time such as a second. This prevents nuisance shutdowns by accidental opening of the safety switch means 11 by transient vibration conditions. The only way in which this system can be shut down is by a definite opening of the safety switch means 11 thereby allowing the voltage on the secondary 28 to rise thereby driving the voltage across capacitor 42 to a sufficient level to turn the transistor Q1 to an "off" condition. The time delay discharge of capacitor 42 must again occur before the system can be restarted.

It can thus be seen by the use of the simple expedient of the parallel impedances 32 and 34, two different types of control function can be provided for the same compressor and motor 10 for two different types of conditions. The "locked rotor"

condition supplies an initial flow of current that is sufficient to shut the system down regardless of the fact that both resistors or impedances 32 and 34 are in the circuit. The circuit will operate also with a slowly rising unsafe condition due to the opening of the safety switch means 11 and the removal of the impedance or resistance 32 from the parallel relationship with impedance or resistance 34. The capacitor 42 also provides a time delay function in the restarting of the compressor and motor 10 when any type of shutdown occurs whether it be due to a "locked rotor" condition, a safety switch means operation, or a momentary opening and closing of the controller 60. All three of these functions are available with one simple circuit utilizing the unusual concept of a current transformer with the dual impedances in parallel with the secondary of the transformer for the provision of two different output functions from this single current transformer. It is quite obvious that many modifications could be made in the present system and a simple preferred arrangement has been disclosed. The applicant wishes to be limited in the scope of his invention, however, only by the scope of the appended claims.

The embodiments of the invention in which an exclusive property or right is claimed are defined as follows:

1. A system protection circuit adapted to be connected to an electric motor wherein the system includes safety switch means responsive to a system parameter to protect the system when an unsafe condition exists, including: a series circuit including a primary winding of a current transformer and controllable switch means adapted to connect said motor to a source of voltage; a current transformer secondary winding including first impedance means connected so that a voltage developed across said secondary winding is impressed across said first impedance means; second impedance means connected through said safety switch means in a circuit with said first impedance means when said system is operating normally; circuit means including energy storage means connected to said secondary winding to store electrical energy at a rate governed by said motor operation and the condition of said safety switch means; switching circuit means responsive to said stored electrical energy to operate said controllable switch means to disconnect said electric motor from said source of voltage in the event that said energy storage means stores sufficient energy from said secondary winding; and said switching circuit means further including diode and resistor means connected across said energy storage means to provide a time delay discharge of said energy storage means prior to said switching circuit means automatically resetting after operation of said controllable switch means in the event of said controllable switch means operating due to an unsafe condition.

2. A system protection circuit adapted to be connected to an electric motor as described in claim 1 wherein said impedance means are resistors and said energy storage means is a capacitor.

3. A system protection circuit adapted to be connected to an electric motor as described in claim 2 wherein said switching circuit means includes transistors and connection means to control solid state switch means to operate said controllable switch means.

4. A system protection circuit adapted to be connected to an electric motor as described in claim 3 wherein said safety switch means is a temperature responsive switch in thermal contact with said electric motor to protect said motor from temperature overloads.

5. A system protection circuit adapted to be connected to an electric motor as described in claim 4 wherein an electrically conductive shunt is connected across said current transformer primary winding to adjust said protection circuit to the normal current capacity of said motor.

6. A system protection circuit adapted to be connected to an electric motor as described in claim 1 wherein said switching circuit means includes transistors and connection means to control solid state switch means to operate said controllable switch means.

7. A system protection circuit adapted to be connected to an electric motor as described in claim 6 wherein said impedance means are resistors and said energy storage means is a capacitor.

8. A system protection circuit adapted to be connected to an electric motor as described in claim 7 wherein said controllable switch means is an electromagnetic contactor including mechanical contacts to control said electric motor.

9. A system protection circuit adapted to be connected to an electric motor as described in claim 8 wherein said safety switch means is a temperature responsive switch in thermal contact with said electric motor to protect said motor from temperature overloads.

* * * * *